Sept. 8, 1936.  M. H. HANSEN  2,053,955

WEIGHING SCALE

Filed March 27, 1933  2 Sheets-Sheet 1

Inventor:
Marius H. Hansen,
By Chindall Parker Karlson
Attys.

Sept. 8, 1936.    M. H. HANSEN    2,053,955
WEIGHING SCALE
Filed March 27, 1933    2 Sheets-Sheet 2
Inventor:
Marius H. Hansen,
By Lindahl Parker Carlson
Attys.
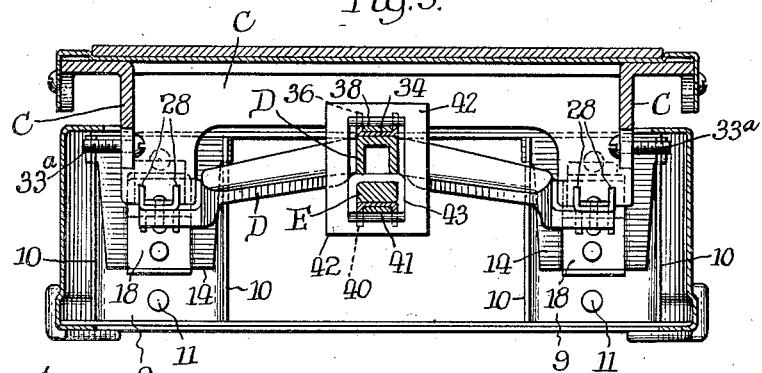

Patented Sept. 8, 1936

2,053,955

UNITED STATES PATENT OFFICE 2,053,955

WEIGHING SCALE

Marius H. Hansen, Chicago, Ill., assignor to Hanson Scale Company, Chicago, Ill., a corporation of Illinois Application March 27, 1933, Serial No. 662,913

7 Claims. (Cl. 308—2)

Competition has so greatly reduced the price of bathroom and physicians' scales that cheapness of manufacture has become essential. The general object of my invention is to reduce the cost of manufacture of scales of this type while preserving the desirable qualities of accuracy and durability.

More specifically, it is an object of the present invention to provide a form of bearing for scale parts which is relatively inexpensive to manufacture, but which is almost frictionless and therefore subject to very little wear, so that it will remain in good condition for a long time.

A further object is to provide a type of construction which will enable the manufacturer to use the base of the scale and the scale mechanism therein contained with heads or columns of different heights, as, for example, a low head such as is used in bathroom scales, or a relatively high column such as is used in physicians' scales.

A further object is to arrange the counterbalancing spring in such a way that it may be readily adjusted from a point outside the scale and without distorting the coils of the spring.

A further object is to provide improved means for adjusting the mechanism so that the movement of the pointer shall correspond to the weight placed on the platform.

A further object is to improve the construction of the corners of the box which constitutes the base of the scale.

In the accompanying drawings:

Fig. 3 is a vertical sectional view in the plane of dotted line 3—3 of Fig. 2.

Fig. 4 is a vertical sectional view in the plane of line 4—4 of Fig. 2.

Fig. 5 is a fragmental plan view of one corner of the box.

Fig. 6 is a section on line 6—6 of Fig. 5.

Fig. 7 is a section on line 7—7 of Fig. 4.

Fig. 8 is a section on line 8—8 of Fig. 1.

Fig. 9 is a section on line 9—9 of Fig. 7.

Fig. 10 is a perspective view of a sheet-metal element used in the construction of certain parts.

Fig. 11 is a perspective view of one end of a lever comprised in the scale mechanism.

Fig. 12 is a perspective view of a hanger employed in the mechanism.

Figure 1:
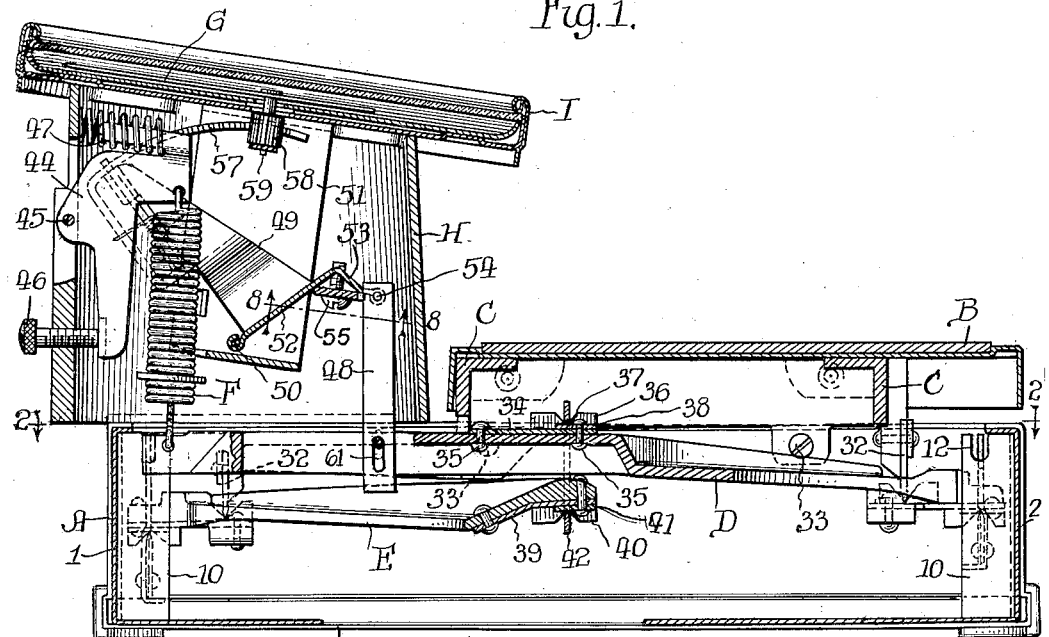
Figure 1 is a vertical sectional view of a weighing scale embodying the features of my invention, the view being taken approximately in the plane of dotted line 1—1 of Fig. 2.

In the drawings, A is the box or casing which constitutes the base or supporting frame of the scale and which houses a portion of the scale mechanism. B is the platform. C is a cast-metal frame that supports the platform B. D and E are levers which support the frame C. Each of the levers D and E is supported at one end in the box A. The other end of the lever E is supported by the lever D at a point approximately midway of the length of the latter. One end of the lever D is connected to the counterbalancing spring F. The lever D is also connected to the indicating pointer G. The spring and the connections between the lever D and the pointer G are contained within a head or column H, said head also supporting the dial I.

The box or casing A may be of any desired construction, but it is preferably formed of sheet metal. Herein the vertical walls of the casing are composed of two sections 1 and 2 rigidly secured together, each section being formed of a piece of sheet metal bent to provide the end and side portions of the box. The construction of the corners is illustrated in Figs. 5 and 6, where it will be seen that the blank from which the box section is formed is bent to provide the vertical wall 3 and two horizontal flanges 4 and 5. One end of the flange 4 is extended to fill the corner formed by the bending of the vertical wall 3. The extended portion of the flange 4 is indicated at 6, and it will be seen that the portion 6 has a rounded edge 7 conforming to the curvature of the vertical wall 3. The flange 5 abuts against the extension 6. The corner construction just described, while simple and inexpensive, is strong and well adapted to the present purpose.

One of the important features of the present invention relates to the character of the means by which the levers D and E are mounted in the casing A, the means by which said levers are connected to each other, and the means by which the frame C is supported upon said levers. The parts C, D and E being castings, it would be impracticable to form bearings directly in or on the castings without making the castings of expensive material and subjecting the castings to machining operations and subsequent heat treatment. The problem of providing good bearing elements in the casing A to cooperate with the bearing elements on the castings D and E would still remain. I have solved these difficulties by providing knife-edge bearings constructed in the manner to be now described.

The four bearings provided in the casing A to support the levers D and E are substantially similar. Within and adjacent to each corner of the casing A is a sheet-steel channel-shaped bracket 8 (Fig. 9) composed of a web 9 and the flanges 10. The web 9 is secured to the wall of the casing A by suitable means, such as two rivets 11 (Fig. 4). In the upper edge of each of the flanges 10 is a notch 12, said notches serving to support lugs 13 on the upper end of a hanger 14 (Fig. 12) in the form of a flat piece of sheet steel. The notches 12 are sufficiently large to permit the hanger 14 to swing. On the lower end of the hanger 14 is a horizontal flange 15. Directly above the flange 15 the hanger 14 is formed to provide a shallow recess 16. Above the recess 16 is an opening 17. A steel plate 18 is secured in the recess 16 by means of a rivet 19, the recess being of such depth that the plate lies in or close to the plane of the hanger. The lower end of the plate 18 rests on the flange 15. The upper portion of the plate 18 extends into the opening 17, and its upper edge is beveled to form a knife edge 20.

All of the four hangers 14 are alike except that the two hangers at the rear end of the casing are somewhat longer than the hangers at the front end of the casing, and the knife-edge bearings 20 are supported in a correspondingly lower plane.

Figure 2:
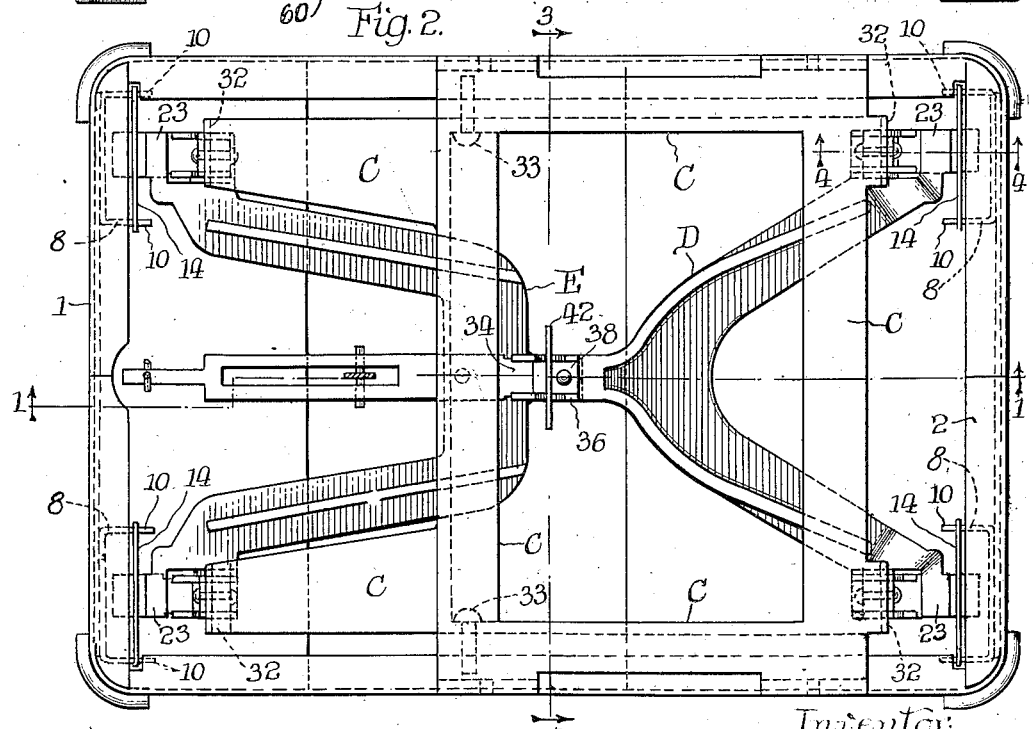
Fig. 2 is a plan view taken in the plane of line 2—2 of Fig. 1, the platform and the head that supports the dial being omitted.

As shown in Fig. 2, the levers D and E are forked to provide bearings which are spaced apart. The lever D has two bearings which are supported by the knife edges 20 in the front end of the casing; and the lever E has two bearings which are supported upon the knife edges in the rear portion of the casing. Each lever also has bearings to support knife edges on the frame C.

The four bearings on the levers D and E are alike. Each comprises a sheet-steel element 21 (illustrated in Fig. 10) and comprising a web 22. The outer end 22ª underlies a lug 23 on the lever, while the end 22ᵇ of the element 21 overlies a lug 24 on the lever. Rivets 25 secure the element 21 rigidly to the lever. Parallel flanges 26 struck down from the end portion 22ª have V-shaped notches 27 therein. Similar flanges 28 are struck up from the end 22ᵇ and have V-shaped notches 29 therein. A sheet-steel plate 30 is secured to the underside of the portion 22ª by means of the rivet 25, said plate extending across the space between the two V-shaped notches 27. A similar sheet-steel plate 31 is secured to the end portion 22ᵇ by means of the rivet 25, and extends between the V-shaped notches 29. The plate 30 is adapted to rest upon the knife edge 20. The V-shaped notches 27 are just sufficiently deep so that they will allow the knife edge 20 to bear upon the plate 30, the purpose of the notches being to prevent any material degree of displacement of the plate transversely of the knife edge 20.

The four plates 31 support sheet steel plates 32 (Fig. 4) which are secured to the frame C by means of rivets 33. The plates 32 have knife edges which rest upon the plates 31. The V-shaped notches 29 serve to prevent displacement of the plates 32 with reference to the plates 31 in a direction transverse to the plates 32. Screws 33ª (Fig. 3) carried by the frame C and extending under the top flanges of the casing A prevent the platform from being lifted off the scale levers.

The forward end of the lever E is supported from the mid-portion of the lever D by means of a bearing essentially similar to the bearings which support the ends of said levers. A sheet steel plate 34 (Fig. 1) is secured to the upper side of the lever D by means of rivets 35. Said plate has two upturned flanges 36 having V-shaped notches 37. Between the flanges 36 is a sheet steel bearing plate 38 which is secured in place by means of the rivet 35.

To the lower side of the forward end of the lever E is riveted a sheet steel plate 39 having notched flanges 40 like the flanges 36. Between the flanges 40 is a sheet steel bearing plate 41.

A sheet steel link or hanger 42 (Fig. 3) in the form of a flat plate having a rectangular opening 43 serves to support the forward end of the lever E from the lever D. The upper and lower end walls of the opening 43 are beveled to provide knife edges which bear against the plates 38 and 41. The V-shaped notches in the flanges 36 and 40 serve to prevent displacement of said knife edges in a direction transverse to those edges.

It will be seen that the levers D and E are supported in the casing A by means of knife-edge bearings which, while of simple and cheap construction, are of a substantial and durable nature. The pressure exerted upon the bearings is carried by knife edges resting upon flat relatively hard plates of sufficient width to insure long life. The V-shaped notches are not depended upon to carry any weight, but merely to prevent relative displacement between the knife edges and the plates against which they bear. It will also be seen that the hangers 14 and 42, being free to swing, allow the knife-edge bearings to adjust their positions as the levers D and E are oscillated in the operation of the scale.

The rear end of the lever D is connected to the lower end of the counterbalance spring F. The upper end of said spring is connected to one arm of a bell crank 44 (Fig. 1) which is pivoted in the head H at 45. The other arm of the bell crank 44 bears against an adjusting screw 46 which is screwed into the rear side of the head H. A spring 47 is interposed between the first-mentioned arm of the bell crank 44 and the rear wall of the head H to insure that the bell crank shall be maintained in engagement with the adjusting screw. The screw 46 affords means for adjusting the pointer to zero.

The connection between the lever D and the pointer G comprises a link 48 having a pin-and-slot connection with the lever D. The upper end of the link 48 is pivoted to a bell crank lever 49 pivoted at 50 in a bracket 51 which is attached to the underside of the frame of the dial I. The arm 52 of the bell crank 49 is bent to form the angular portion 53. The link 48 is pivoted to the outer end of the angular portion 53 at 54. Means is provided to adjust the degree of angularity of the portion 53, the means herein shown for that purpose comprising two screws 55 (Figs. 1 and 8) threaded into the apex of the angle, the heads of said screws bearing against a plate 56 that extends across the angle.

The other arm of the bell crank 49 carries a curved rack 57 which meshes with a pinion 58 fixed on the shaft 59 that carries the pointer G. It will be seen that by drawing up the screws 55 the angular portion may be bent to make the angle less acute, thus increasing the effective length of the arm 52 of the bell crank 49, and thus adjusting the movement of the pointer to correspond with the movement of the platform. Such bending of the angular portion 53 may be done after the scale has been assembled by inserting a screw-driver up through the opening 60 (Fig. 1) in the bottom of the casing A.

Gravity tends to cause the bell crank 49 to swing forwardly. When the lever D descends under a load placed on the platform, the lever 49 follows the lever D. The pin-and-slot connection 61 between the lever D and the link 48 prevents excessive shock from being transmitted from the platform to the pointer.

The head or column H is secured to the rear portion of the casing A. It will be seen that the construction herein described may be utilized in the production of so-called physicians' scales by substituting a taller column or head H for the relatively short one herein illustrated and by using a correspondingly longer link 48 and a longer connection between the lever D and the spring F.

The construction herein described, although relatively cheap to manufacture, is very sensitive and accurate, and will remain so for a long time. The parts 18, 21, 30, 31, 32, 34, 38, 39, 41 and 42 may be case-hardened, tempered or otherwise treated to impart sufficient hardness.

I claim as my invention:

1. A weighing scale mechanism comprising a cast metal scale lever, a relatively hard plate formed of sheet metal attached to said lever, a support having a sheet metal knife edge that bears against said plate, said knife edge and plate forming a pivotal bearing between the scale lever and the support, and a V-shaped member to prevent displacement of the knife edge with relation to the plate in a direction transverse of the knife edge, while allowing pivotal movement between the knife edge and said plate, said knife edge lying within said member.

2. A weighing scale mechanism comprising a lever, a sheet-metal member attached to said lever and comprising a web having an angular flange having a V-shaped notch therein, a sheet metal bearing plate attached to said web, and a support having a sheet metal knife edge that bears against said plate and lies in said V-shaped notch, said notch preventing displacement of the knife edge with relation to the plate in a direction transverse to the knife edge.

3. In a weighing scale, a cast-metal lever, a sheet-metal member attached to said lever, said member having two angular flanges extending in opposite directions and each flange having a V-shaped notch, two bearing plates attached to said sheet-metal member each adjacent to one of said notches, a plate having a knife edge which supports one of the bearing plates and extends into the adjacent notch, and a scale platform having attached thereto a plate having a knife edge which rests upon the other bearing plate and extends into the other notch, said notches serving to prevent displacement of the knife edges in a direction transverse to said knife edges.

4. A weighing scale mechanism comprising a hanger composed of a sheet-metal plate having pivot lugs on opposite sides near its upper end, an angular flange near its lower end, said plate being formed to provide a recess above said flange and an opening above said recess, a plate secured to said hanger and lying in said recess and resting on said flange, the upper edge of the last-mentioned plate having a knife edge which projects into said opening, a scale lever projecting into said opening and resting upon said knife edge, and means engaging said pivot lugs for supporting the hanger.

5. A weighing scale mechanism comprising a hanger composed of a sheet-metal plate having pivot lugs on opposite sides near its upper end, said plate being formed to provide a recess above said flange and an opening above said recess, a plate secured to said hanger and lying in said recess, the upper edge of the last-mentioned plate having a knife edge which projects into said opening, a scale lever projecting into said opening and resting upon said knife edge, and means engaging said pivot lugs for supporting the hanger.

6. A weighing scale mechanism comprising a hanger composed of a sheet-metal plate formed to provide a recess and an opening above said recess, a sheet metal plate secured to said hanger and lying in said recess, the upper edge of the last-mentioned plate having a knife edge which projects into said opening, and a scale lever projecting into said opening and resting upon said knife edge.

7. A weighing scale mechanism comprising a casing, a channel-shaped sheet-steel member attached to said casing and having notches in the upper edges of the flanges of said member, a hanger composed of a sheet-metal plate having pivot lugs that rest in said notches, a sheet metal knife-edge plate secured to the hanger, and a scale lever resting on said knife-edge plate.

MARIUS H. HANSEN.